United States Patent Office 3,476,201
Patented Nov. 4, 1969

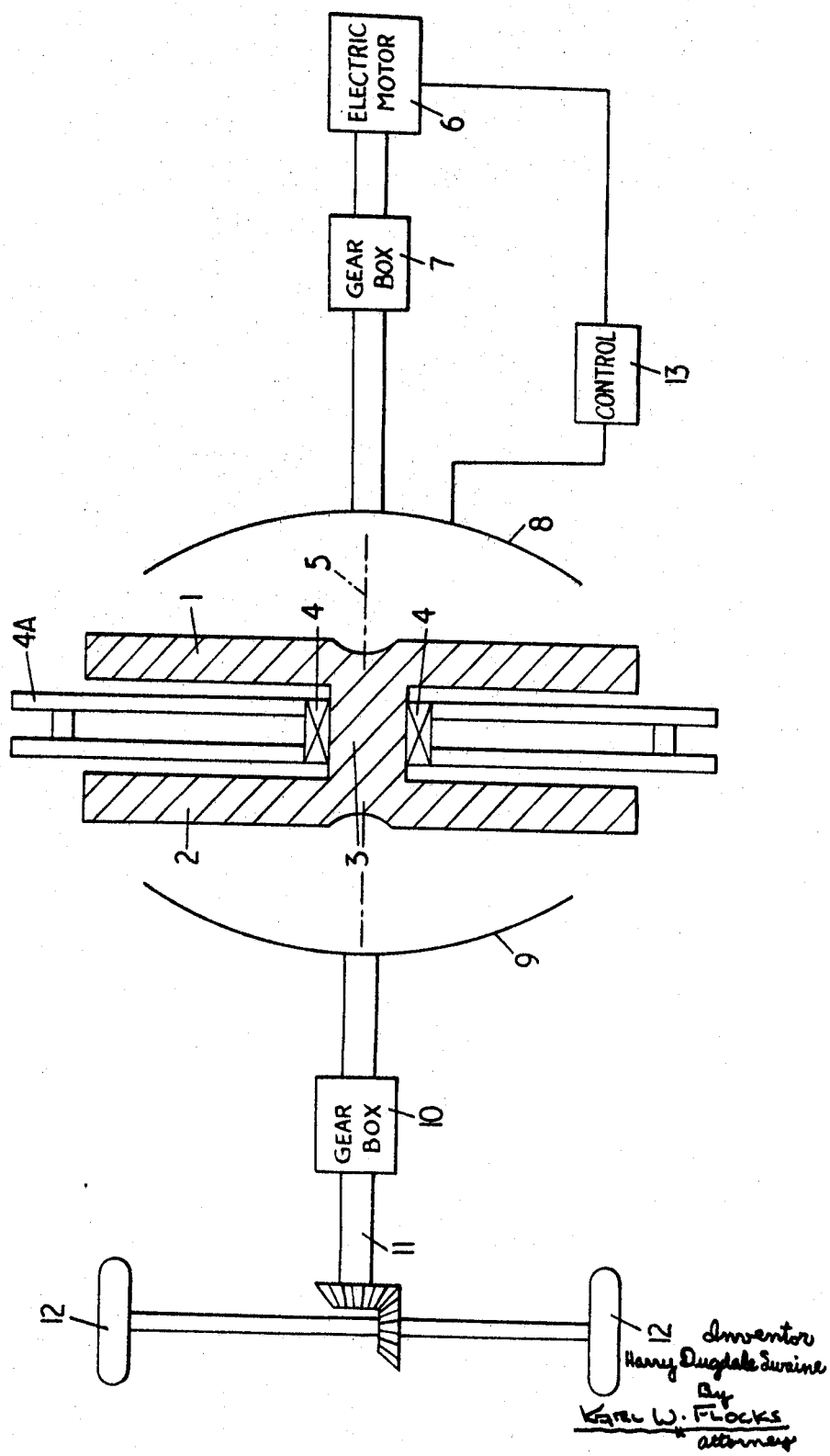

3,476,201
DRIVE SYSTEM FOR A VEHICLE
Harry Dugdale Swaine, 15 Northborough Road,
Norbury, London, SW. 16, England
Filed Feb. 21, 1968, Ser. No. 707,130
Int. Cl. B60k 1/00; G05g 1/00; H02k 7/02
U.S. Cl. 180—65                                    4 Claims

ABSTRACT OF THE DISCLOSURE

A drive system for a vehicle in which a double flywheel has two flanges respectively alternatively connectable to the motor and the wheels to be driven.

---

This invention relates to a drive system for a vehicle and particularly a drive system including a rotary intertia mass commonly known as a flywheel.

While it has been suggested before to incorporate in a vehicle driven by an internal combustion engine a flywheel which is alternatively connectable to the engine or to the wheels to be driven, so that the flywheel could be accelerated while the vehicle was stationary: as the motor in this arrangment was always running it did not provide a saving in fuel or engine size and was comparatively complicated and expensive to manufacture.

An object of the present invention is to provide a drive system for a vehicle which is simple and cheap to construct and alloys economy of the power unit size and cost and in the use of fuel.

Accordingly, the invention provides, in a vehicle, a drive system comprising a double flywheel having first and second flanges joined by a short central shaft, a bearing in which the shaft is mounted, a first clutch engageable with and disengageable from the first flange and connected to a power drive means, and a second clutch engageable with and disengageable from the second flange and connected to the part to be driven.

Preferably the power drive means comprises an electric motor and means are provided for automatically switching off and on the motor as the first clutch is disengaged from and engaged with the first flange.

An embodiment of drive system for a vehicle, in accordance with the invention, will now be described, by way of example only, with reference to the accompanying diagrammatic section through a drive unit.

Referring to the drawing, a double flywheel has a pair of disc like flanges 1 and 2 joined by a short central shaft 3, mounted in a bearing 4 for rotation about its horizontal axis 5. The bearing 4 is carried in a pair of plates 4A boxed together with distance pieces and extending between the flanges and secured to the chassis of the vehicle. Each of the flanges 1 and 2 has a relatively large moment of inertia, the flywheel being mounted so that it can run free in the bearing. An electric motor 6 has a drive shaft connected through a gear box 7 to a clutch 8 which is engageable with and disengageable from the flange 1 of the flywheel. A further clutch 9 is engageable with and disengageable from the other flange 2 of the flywheel and is connected via a gearbox 10 to, for example, the vehicle propellor shaft 11 and differential gear so as to drive the wheels 12. The clutches 8 and 9 are independently operable.

In operation, for example when the vehicle is stationary, the clutch 8 is engaged with flange 1 and the motor is started to accelerate the flywheel. When it is required to start the vehicle moving, the clutch 8 is disengaged and the clutch 9 engaged and the inertia of the flywheel will drive the vehicle through the gear box 10. The normal surge of current which is required for the motor to start and accelerate a vehicle from a start position is thus eliminated and the torques normally applied by the motor are applied gradually to the flywheel. As the vehicle proceeds the flywheel can be disconnected from the wheels which will continue to revolve through momentum while the flywheel is again connected to the motor and re-accelerated. Alternatively, both clutches can be in their engaged position during normal running of the vehicle. When it is required to slow the vehicle down, some of the energy of motion in the vehicle can be put back into the flywheel using the gear box 10, the flywheel then acting as a form of brake. It will be appreciated that this system produces considerable economy in fuel and avoids the surges normally imposed on the power unit at start-up. When the vehicle is being slowed or is running for example down hill, the motor may be switched off. Preferably, an automatic control, indicated by a control system 13 is provided so that as the clutch 8 is disengaged the motor is automatically switched off and as the clutch is re-engaged the motor is restarted.

In a preferred arrangement the motor is adapted to be driven from the mains as well as from a battery in the vehicle so that initial acceleration of the flywheel can be achieved by connecting the motor to the mains, while during normal running the motor will be connected to the battery.

I claim:
1. In a vehicle a drive system comprising a double flywheel having first and second flanges joined by a short central shaft, a bearing in which the shaft is mounted, a first clutch engageable with and disengageable from the first flange and connected to a power drive means, and a second clutch engageable with and disenagageable from the second flange and connected to the part to be driven.

2. In a vehicle a drive system comprising a double flywheel having first and second flanges joined by a short central shaft, a bearing in which the shaft is mounted for rotation about its horizontal axis, a first clutch engageable with and disengageable from the first flange and connected to an electric motor, and a second clutch engageable with and disengageable from the second flange and connected through a gear box with the vehicle wheels.

3. In a vehicle a drive system according to claim 2 in which the electric motor is arranged to be driven either from a battery or from a mains supply.

4. In a vehicle a drive system according to claim 2 including means for automatically switching off and on the motor as the first clutch is disengaged from and engaged with the first flange.

References Cited

UNITED STATES PATENTS

| 2,670,449 | 2/1954 | Brice | 192—.2 XR |
| 3,205,965 | 9/1965 | Roth | 180—65 |
| 3,208,303 | 9/1965 | Durouchoux | 74—572 |

FOREIGN PATENTS

| 271,810 | 5/1928 | Great Britain. |
| 379,737 | 4/1940 | Italy. |

LEO FRIAGLIA, Primary Examiner
MILTON L. SMITH, Assistant Examiner

U.S. Cl. X.R.
74—572; 192—.2; 318—161